United States Patent
Morisawa

(10) Patent No.: US 7,797,315 B2
(45) Date of Patent: Sep. 14, 2010

(54) RETRIEVAL SYSTEM AND METHOD OF DISPLAYING RETRIEVED RESULTS IN THE SYSTEM

(75) Inventor: Shuichi Morisawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 370 days.

(21) Appl. No.: 11/936,708

(22) Filed: Nov. 7, 2007

(65) Prior Publication Data

US 2008/0120293 A1   May 22, 2008

(30) Foreign Application Priority Data

Nov. 20, 2006   (JP)   ............................. 2006-313598

(51) Int. Cl.
*G06F 17/30* (2006.01)
(52) U.S. Cl. ...................... 707/725; 707/748; 707/749; 707/782
(58) Field of Classification Search ...................... 707/5, 707/725
See application file for complete search history.

(56) References Cited

U.S. PATENT DOCUMENTS

| | | | |
|---|---|---|---|
| 7,058,624 B2 * | 6/2006 | Masters | 707/723 |
| 2002/0058520 A1 * | 5/2002 | Nakagawa | 455/456 |
| 2002/0196460 A1 * | 12/2002 | Parry | 358/1.15 |
| 2003/0046275 A1 * | 3/2003 | Osias | 707/3 |
| 2005/0024674 A1 | 2/2005 | Fujishige | 358/1.14 |
| 2005/0119921 A1 * | 6/2005 | Fitzgerald et al. | 705/5 |
| 2006/0265762 A1 | 11/2006 | Morisawa | 726/27 |
| 2006/0279628 A1 * | 12/2006 | Fleming | 348/143 |
| 2006/0294453 A1 * | 12/2006 | Hirata | 715/500.1 |
| 2007/0266017 A1 * | 11/2007 | Held et al. | 707/4 |
| 2007/0299813 A1 * | 12/2007 | Subramaniam et al. | 707/2 |

FOREIGN PATENT DOCUMENTS

| | | |
|---|---|---|
| JP | 2005-049972 | 2/2005 |
| WO | 00/51042 | 8/2000 |
| WO | 2005027092 A1 | 3/2005 |

OTHER PUBLICATIONS

S. Khungar and J. Riekki: "Context Based Storage: System for Managing Data in Ubiquitous Computing Environment", Proc. 12th International Conference on Advanced Computing & Communication, [Online] Dec. 15-18, 2004 XP002474055, Ahmedabad, India, Retrieved from the Internet: URL:http://www.mediateam.oulu.fi/publications/pdf/599.pdf> [retrieved on Mar. 27, 2008].

(Continued)

*Primary Examiner*—Hung T Vy
*Assistant Examiner*—Binh V Ho
(74) *Attorney, Agent, or Firm*—Fitzpatrick, Cella, Harper & Scinto

(57) ABSTRACT

In a case that documents satisfying search conditions input on a retrieval device are retrieved and there is a plurality of retrieved documents, the priority levels of the retrieved documents are determined based on the installation site of the retrieval device, information on the date and time when a search is executed, and information on the schedule of events at the installation site, with the display order of the plurality of retrieved documents determined, and the documents displayed, based on the determined priority levels.

12 Claims, 19 Drawing Sheets

OTHER PUBLICATIONS

Harry Chen, Filip Perich, Dipanjan Chakraborty, Tim Finin, Anupam Joshi: "Intelligent Agents Meet Samantic Web in a Smart Meeting Room", Proceedings of the Third International Joint Conference on Autonomous Agents and Multiagent Systems, Jul. 19-23, 2004 pp. 854-861, XP002474056, New York, NY, USA.

A. Bunningen: "Context aware querying—Challenges for data management in ambient intelligence", Technical Report of the University of Twente—Department of EEMCS, Oct. 2004, XP002477275, Enschede.

Anind K Dey et al: "Towards a Better Understanding of Context and Context-Awareness", Internet Citation, [Online] 1999, XP007904306, Retrieved from the Internet: URL:ftp://ftp.cc.gatech.edu.pub/gvu/tr/1999/99-22.pdf> [retrieved on Mar. 13, 2008].

Chen H; Tolia S; Sayers C; Finin T; Joshi A: "Creating context-aware software agents" Lecture Notes in Artificial Intelligence, vol. 2546, 2003, pp. 186-197, Germany ISSN: 0302-9743.

European Search Report dated Jul. 20, 2009 in corresponding European Application No. 07121109.8.

* cited by examiner

FIG. 3

ATTRIBUTE SEARCH

DOCUMENT TITLE : | QUALITY |

CREATOR(S) :

URL :

KEYWORDS :

⦿ MATCH, PARTIAL   ◯ MATCH, FULL

⦿ AND   ◯ OR

[ OK ]   [ CANCEL ]

FIG. 4

SEARCH RESULTS

| | DOCUMENT TITLE | CREATOR | URL |
|---|---|---|---|
| ☑ 1 | QUALITY ASSURANCE SYSTEM.ppt | SATO | file://A¥¥server1¥kaigi¥... |
| ☐ 2 | PRINTER QUALITY REPORT.doc | XXX | file://A¥¥server2¥project¥... |
| ☐ 3 | 2005 QUALITY ASSURANCE IMPROVEMENT ACTIVITIES | YYY | ... |
| ☐ 4 | CAMERA DIVISION QUALITY STANDARDS | ZZZ | ... |
| ☐ 5 | QUALITY HEADQUARTERS ORGANIZATION CHART.xls | WWW | ... |
| ☐ ... | | | |

FIG. 5

| INSTALLATION TYPE | ROOM NAME |
|---|---|
| INSIDE | MEETING ROOM A |
| VICINITY 1 | — |
| VICINITY 2 | — |
| VICINITY 3 | — |
| ... | ... |

FIG. 6

| INSTALLATION TYPE | ROOM NAME |
|---|---|
| INSIDE | – |
| VICINITY 1 | MEETING ROOM B |
| VICINITY 2 | DISCUSSION CORNER 3 |
| VICINITY 3 | TEA ROOM |
| ... | ... |

FIG. 11

| MEETING ID | DATE | START TIME | END TIME | MEETING NAME |
|---|---|---|---|---|
| 31520051020001 | 2005/10/20 | 9:00 | 10:00 | DEPT. MEETING |
| 31520051020002 | 2005/10/20 | 10:00 | 12:00 | DEVELOPMENT PRACTICES |
| 31520051020003 | 2005/10/20 | 13:00 | 15:00 | PRODUCT PLANNING MEETING |
| | | | | |

FIG. 12

OCTOBER 20 DEVELOPMENT REGULAR MEETING AGENDA

1. BUSINESS TRIP REPORT — MR. YAMADA, CHIEF
2. REGARDING PRODUCT PLANNING — MR. SUZUKI, HEAD OF DEPT.
3. PRODUCT QUALITY ASSURANCE SYSTEM PROPOSAL — MR. SATO, SECTION CHIEF
4. HOW TO PROCEED WITH PATENT SEARCHES — MR. TANAKA

FIG. 14

| DATE | TIME | VISITOR NAME | MEETING LOCATION |
|---|---|---|---|
| 2005/10/20 | 9:00 | MR. X, COMPANY A | RECEPTION ROOM NO. 3 |
| 2005/10/20 | 9:00 | MR. Y, COMPANY B | CONFERENCE HALL |
| 2005/10/20 | 9:30 | MR. Z, COMPANY C | DISCUSSION CORNER 2 |
| 2005/10/20 | 10:00 | MR. W, COMPANY D | TEA ROOM |

FIG. 17

| | |
|---|---|
| ... | ... |
| RETRIEVAL DEVICE 020 | MEETING ROOM C |
| | DIRECTOR RECEPTION ROOM |
| | RECEPTION ROOM NO. 3 |
| | MEETING ROOM A |
| | ... |
| RETRIEVAL DEVICE 021 | OFFICE MANAGER'S ROOM |
| | CONFERENCE HALL |
| | RECEPTION ROOM NO. 2 |
| | TEA ROOM |
| | ... |
| RETRIEVAL DEVICE 022 | DISCUSSION CORNER 2 |
| | MEETING ROOM B |
| | RECEPTION ROOM NO. 1 |
| | RECEPTION ROOM NO. 3 |
| | OFFICE MANAGER'S ROOM |
| | ... |
| ... | ... |

FIG. 18

| | |
|---|---|
| VICINITY 1 | 5 |
| VICINITY 2 | 4 |
| VICINITY 3 | 3 |
| VICINITY 4 | 2 |
| VICINITY 5 | 1 |
| OTHER | 0 |

FIG. 19

| | |
|---|---|
| 0-30 MINUTES | 6 |
| 31-60 MINUTES | 5 |
| 61-90 MINUTES | 4 |
| 91-120 MINUTES | 3 |
| 121-150 MINUTES | 2 |
| 151-180 MINUTES | 1 |
| OTHER | 0 |

RETRIEVAL SYSTEM AND METHOD OF DISPLAYING RETRIEVED RESULTS IN THE SYSTEM

BACKGROUND OF THE INVENTION

1. Field of the Invention

The present invention relates to a retrieval system for accumulating documents comprising images and retrieving documents from the accumulated documents based on user operations, as well as to a method of displaying retrieved results in the system.

2. Description of the Related Art

Multi-functional peripherals, which combine the features of printers, copiers, faxes, etc., can be installed not only in offices, but also in lobbies, reception rooms, meeting rooms, and other public spaces.

For this reason, it is believed that it is becoming increasingly important in office work to be able to quickly search and output target documents from the nearest multi-functional peripherals during unstructured time, such as waiting time spent in appointments, during meetings, or while in transit from one location to another, etc.

On the other hand, in many cases, a search process involving storage facilities coupled to the network results in a huge number of document hits. For this reason, for a set of documents comprising a large number of accumulated documents, it is necessary to define search conditions so as to keep the number of search hits below a certain level. However, setting precise search conditions requires search process know-how. The unavailability of such know-how may lead to a situation, wherein even the creators of the documents themselves will not be able to retrieve the documents they created in a simple manner.

In a document retrieval system, in which users look for documents they need among a huge number of accumulated documents, the users enter the search conditions with the help of a special search screen. In case of a large number of documents satisfying the entered search conditions, the users must further perform the following operations in order to accomplish their goal.

First of all, as a first countermeasure, it is contemplated to redo the search by setting more stringent search conditions in the belief that the reason might be due to excessively loose search conditions.

Next, as a second countermeasure, it is contemplated to execute a so-called search refinement, during which the initially retrieved search results are narrowed down by adding other search conditions, without resetting the initial search conditions and clearing the search results, as it was done in the above-described first countermeasure. Here, if the additional search conditions are appropriate, the number of document hits can be made smaller than the initial number of hits, thereby making it possible to narrow down the range of the desired documents.

Furthermore, as a third countermeasure, it is contemplated to drop the idea of redoing the search based on other search conditions because it is impossible to set conditions that would be more appropriate than the specified search conditions and, instead, to find the target documents by sequentially examining the documents retrieved in the initial search one by one. If the attributes of the documents, in other words, the titles, creators, creation dates, comments, etc., of the documents, are shown at such time on the screen displaying the retrieved document list, there may be cases, in which it might be possible to find the target documents based on such attribute information. Otherwise, however, a certain time will be necessary to start up a document viewer or a document application in order to make a determination by checking the respective contents of the retrieved documents and, therefore, the operation of sequentially examining the retrieved documents will require considerable time. Furthermore, it is also contemplated that the search results in the above-described first and second countermeasures will not be sufficiently narrowed down and there will remain a large number of document hits. In such a case, users are forced to use the third countermeasure, that is, to sequentially search the target documents in the retrieved document list.

An effective way to reduce the effort of the users associated with the above-described search process is for the document retrieval system to distinguish documents that the users may consider necessary and display them in a preferential manner in comparison with the other retrieved documents. Changing the display order of the search results in this manner has the advantage of making it possible to find the target documents more quickly when the users perform the checking operation starting from the beginning of the retrieved document list. In this manner, the users can retrieve the desired documents in an efficient manner by dynamically optimizing the order, in which the search results are displayed.

As a means therefore, during retrieval of documents registered in multi-functional peripherals installed in various locations, the documents that the users may consider necessary are inferred from the installation sites of the multi-functional peripherals and from the timing of the searches. It is contemplated that it is effective to provide a technology for rearranging and displaying the search results in a suitable order.

As a result of noise reduction measures, size reduction, and progress in the design of multi-functional peripherals, multi-functional peripherals are now installed in lobbies, reception rooms, meeting rooms, and other office-like locations that were not considered in the past, with the peripherals being interconnected through a network and capable of offering various services. Accordingly, the users who make use of these multi-functional peripherals now include company employees from various departments and even external parties. In such a situation, it is believed that, depending on the locations where the multi-functional peripherals are installed, the intentions of the users who employ them will exhibit particular trends. For example, in situations that often arise in lobbies and reception rooms, new additional reference materials become necessary during informal discussions between company employees and external parties. During such discussions one might wish to retrieve and present the necessary documents right on the spot. In other words, it is believed that users executing searches in a lobby or reception room are highly likely to retrieve documents intended for use during meetings and informal discussions taking place during that particular time period. Thus, the retrieval system works in cooperation with a reservation system for meeting rooms and visiting schedules of external parties, and checks them against the search times and installation sites of the multi-functional peripherals, on which the searches are executed. It is believed that, under such circumstances, the documents that users might consider necessary can be found within a shorter period of time if the display order of the retrieved documents is rearranged in such a manner that visitor-and meeting-related documents among the documents matching the search conditions are shifted to a higher priority on the search results list.

However, at present, search results are always displayed in the same order and degree of priority according to the searcher's access rights and specified search conditions no matter where the multi-functional peripherals or PCs are located, regardless of parameters such as the locations, in which the multi-functional peripherals are installed, or the times when the searches are executed. For instance, even when conducting an attribute search, that is, conducting a search by specifying document attribute information, such as document titles, creators, and the like, the same results are always returned in a fixed fashion when conducting a search under the same conditions, with the results displayed simply in the order, in which they were obtained, in accordance with the internal algorithms that the retrieval system has.

Moreover, while there are systems that dynamically vary the arrangement of the document hits, what they do is to consider the frequency of access and the frequency of use of documents so as to display the documents that are frequently used in higher positions on the list.

In Japanese Patent Laid-Open No. 2005-049972, the frequency of use of documents stored in a document storage means is calculated and, after the frequency of use is obtained, it is stored in a memory location. Information on the documents stored in the document storage means is then displayed by the display unit of an operational input means in order of descending frequency of use. According to the disclosed technology, along with displaying information on the documents stored in the document storage means in the order of descending frequency of use, the system accepts selection inputs that select the documents the users want to get, reads the image data of the selected documents from the document storage means and displays it on the display unit of the operational input means.

Thus, in any of the conventional search methods, the display order of the search results is determined without any regard to the environment, in which the users are located. For this reason, it is believed that the documents the users need may often appear at the end of the sorting order. Accordingly, the checking operation requires a lot of time before it locates the desired documents, which is not suitable for searches executed while being engaged in an informal discussion or walking down a corridor using multi-functional peripheral installed there. For this reason, it is believed that users will tend to abandon the idea of using the multi-functional peripheral to perform the search and will return to their workplace in order to re-do the search.

SUMMARY OF THE INVENTION

It is desirable to address the above-described problems of the conventional technology.

According to a first aspect of the present invention, there is provided a retrieval system for retrieving a document from among a plurality of documents, comprising:

a search conditions input unit configured to receive search conditions input by a user on a retrieval device;

a retrieval unit configured to retrieve, from among a plurality of documents stored in a storage device, at least one document satisfying the search conditions received by the search conditions input unit;

a determination unit configured to, in a case that a plurality of documents are retrieved by the retrieval unit, determines the priority levels of the plurality of documents based on scheduling information regarding an event at an installation site of the retrieval device; and a display unit configured to display the documents retrieved by the retrieval unit, the displayed documents being arranged in accordance with the priority levels determined by the determination unit.

According to a second aspect of the present invention, there is provided a method of retrieving a document from among a plurality of documents, comprising the steps of:

receiving search conditions set by a user on a retrieval device;

retrieving, from among a plurality of stored documents, at least one document satisfying the received search conditions;

in a case that a plurality of documents are retrieved in the retrieving step, determining the priority levels of the plurality of retrieved documents based on scheduling information regarding an event at an installation site of the retrieval device; and displaying the retrieved documents, the displayed documents being arranged in accordance with the determined priority levels.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram illustrating an exemplary screen used to specify attribute search parameters on a search conditions entry screen provided by a search conditions input section in the present exemplary embodiment.

FIG. 4 is a diagram illustrating exemplary search results displayed by a search results display section in the present exemplary embodiment.

FIG. 5 and FIG. 6 are diagrams illustrating exemplary installation site information, which shows the installation site of a retrieval device, and which is stored in the installation site storage section in the present exemplary embodiment.

FIG. 11 is a diagram illustrating an exemplary meeting schedule stored in a meeting room reservation device used in the present exemplary embodiment.

FIG. 12 is a diagram illustrating exemplary agenda information used in an exemplary embodiment of the present invention.

FIG. 14 is a diagram illustrating a portion extracted from a visitor list displayed at login to a visitor management device used in the second exemplary embodiment.

FIG. 17 is a diagram showing an example of installation site information used in the second exemplary embodiment.

FIG. 18 is a diagram explaining a meeting location scoring table used in the second exemplary embodiment.

FIG. 19 is a diagram explaining a meeting time scoring table used in the second exemplary embodiment.

DESCRIPTION OF THE EMBODIMENTS

Numerous exemplary embodiments of the present invention will be explained in detail below with reference to the accompanying drawings. The following exemplary embodiments do not limit the claims of the present invention, and not all combinations of the features described in the embodiments are essential to the solving means of the present invention.

Figure 1:
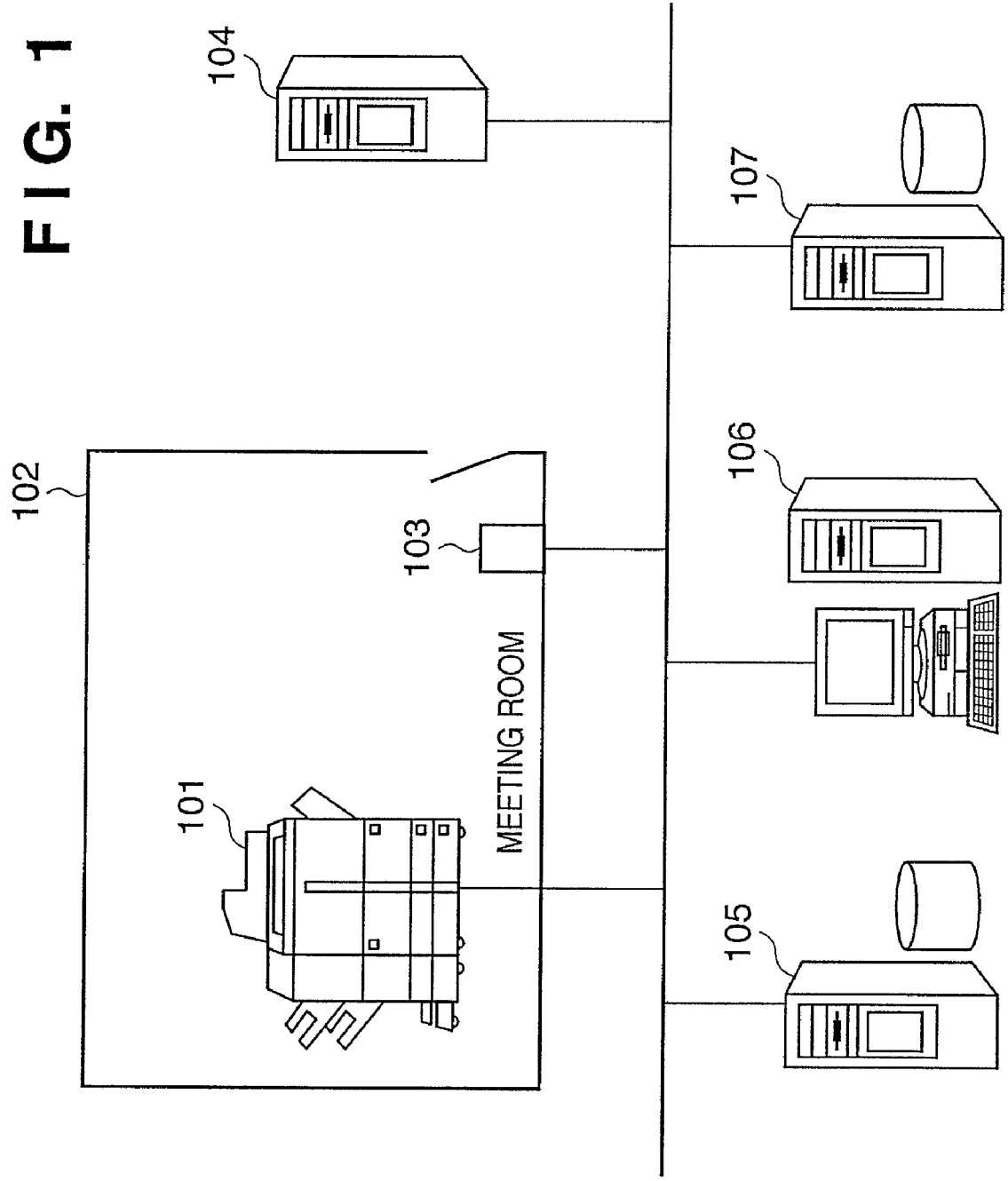
FIG. 1 is a diagram explaining the configuration of a document retrieval system used in an exemplary embodiment of the present invention.

FIG. 1 is a diagram explaining the configuration of a document retrieval system used in an exemplary embodiment of the present invention.

Reference numeral 101 denotes a retrieval device which, in the present exemplary embodiment, is a multi-functional peripheral possessing the functionality of a printer, copier, FAX, etc., and is typically installed in-a corporate office, etc. Reference numeral 102 denotes a meeting room provided in the office. In the present exemplary embodiment, the meeting room is called "Meeting Room A". Reference numeral 103 denotes an entry/exit management system provided at the entrance to the meeting room 102. In the office, company employees and external parties who enter and leave the office always carry ID cards used for security management. Moreover, whenever a person enters or leaves a living space, a meeting room, a reception room, etc., the person is authenticated by scanning their ID card in a card reader managed by the entry/exit management system 103. As a result, the entry/exit management system 103 can, in real time, obtain information on the IDs of the company employees and others present in the meeting room or reception room, in which it is installed.

Reference numeral 104 denotes a schedule management device, which is used by company employees working in the office to enter daily schedules via desktop computers. As a result, the schedule management device 104 gleans information on the schedules of all the company employees based on the entered schedules. Reference numeral 105 denotes storage devices, specifically ones that store intra-office electronic documentation, e.g., various meeting materials, and the like, and operate in a manner similar to a document server. Reference numeral 106 denotes a meeting room reservation device, which enables company employees to reserve all meeting rooms in the office by connecting to the meeting room reservation device 106 via desktop computers. Reference numeral 107 denotes an integrated user authentication device, which exercises overall control over user authentication in the entry/exit management system 103, schedule management device 104, meeting room reservation device 106, etc.

Figure 2:
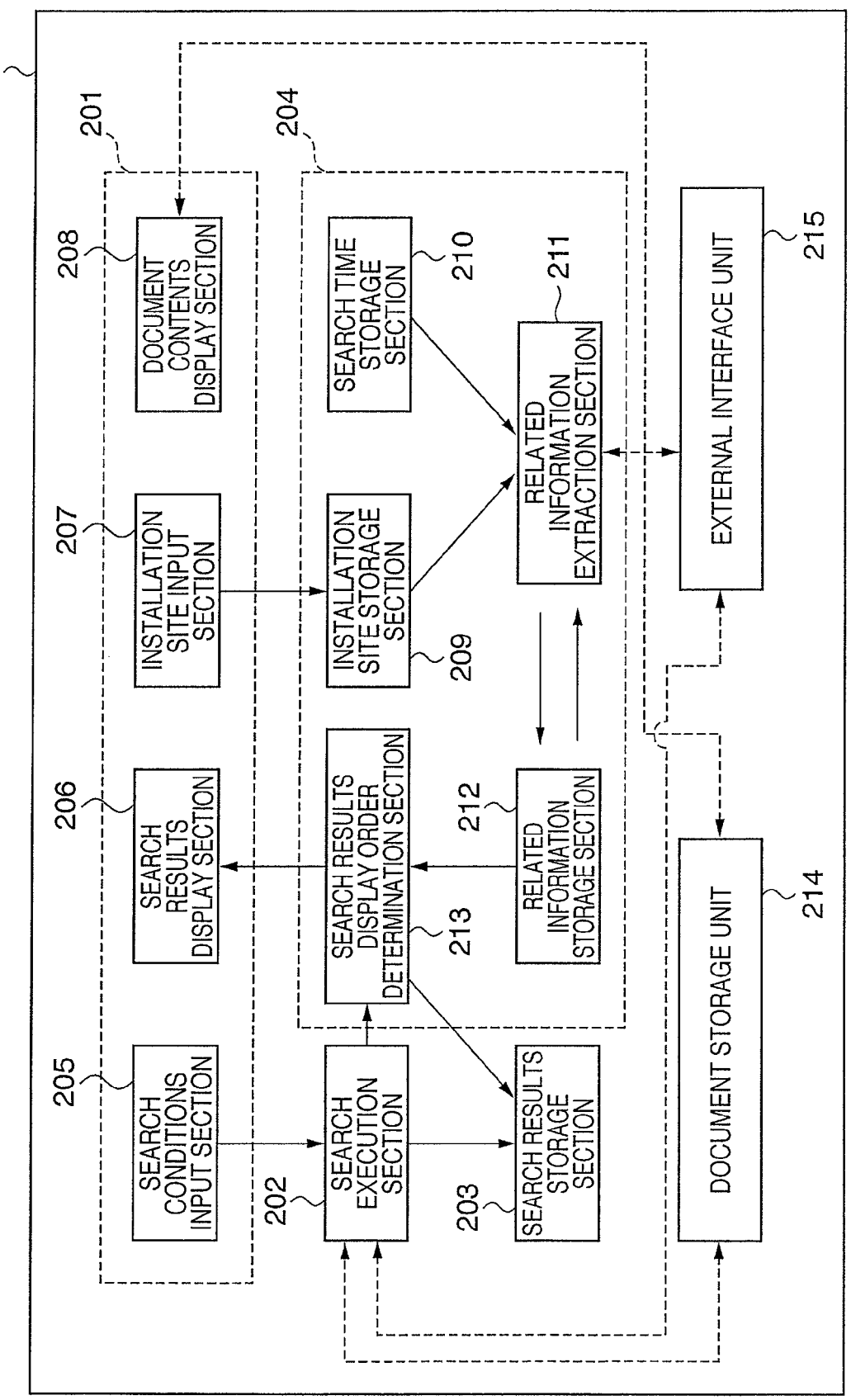
FIG. 2 is a block diagram explaining the internal configuration of the retrieval device according to the present exemplary embodiment.

FIG. 2 is a block diagram explaining the internal configuration of the retrieval device 101 used in the present exemplary embodiment. It should be noted that in the present exemplary embodiment, as described above, the retrieval device 101 is a multi-functional peripheral.

Reference numeral 201 denotes a user interface section, which provides an interface between the retrieval device 101 and users, allowing the users to search for the desired documents and images (collectively referred to hereinafter as "documents") and check search results. The user interface section 201 comprises four elements, including a search conditions input section 205, a search results display section 206, an installation site input section 207, and a document contents display section 208. The search conditions input section 205 possesses a feature that permits entry of search conditions used to search for the desired documents, etc., among documents stored in the retrieval device 101 or in the storage devices 105 coupled to the network.

FIG. 3 is a diagram illustrating an exemplary screen used to specify attribute search parameters on a search conditions entry screen provided by the search conditions input section 205.

In this embodiment, the types of attributes that can be specified as search conditions include "document title", "creator", "URL", and "keywords". Furthermore, when a search is carried out by specifying a "document title", radio buttons are provided to select either "match, partial" or "match, full". The term "match, partial", as used herein, refers to retrieving all documents including the character string of the specified document title as part of the document titles. By contrast, the term "match, full" refers to a situation, in which only documents having document titles absolutely identical to the specified character string are retrieved. For instance, as shown in the figure, if "Quality" is entered as the document title and the option "match, partial" is selected, in addition to documents entitled "Quality", all the documents containing the character string "Quality" as part of the document titles, such as, for instance, "Quality Assurance System", "Printer Quality Report", etc., will be retrieved.

Moreover, in a typical document management system, multiple terms can be entered in order to make it easier for document creators or users with special authority to perform searches when documents are created and stored or at any time after storage. They are stored along with the documents as the "keywords", that is, one of the attributes representing the characteristics of the documents. Documents having the entered keywords are then retrieved during the attribute search. Here, if the user enters multiple keywords, the relationship between them can be selected using radio buttons representing an "AND" condition or an "OR" condition. If "AND" is selected, only documents having all the multiple specified terms as the keywords are retrieved. On the other hand, if "OR" is selected, all the documents having at least one of the terms from among the specified multiple terms as their keywords are retrieved.

Referring again to FIG. 2, the search results display section 206 displays for the user a list of documents matching the search conditions entered using the search conditions input section 205.

FIG. 4 is a diagram illustrating exemplary search results displayed by the search results display section 206.

In this example in FIG. 4, the results shown are retrieved in accordance with the search conditions of FIG. 3. Serial numbers indicating the priority levels of the retrieved documents, document titles, creators, and URLs are displayed using a single line for each document retrieved. Furthermore, checkboxes are displayed at the beginning of each line and checking the checkboxes permits operations on documents selected from among the search results, such as, for instance, displaying or deleting the contents of the documents, checking them out, and other operations. If FIG. 4, a check box of the document having the priority level of "1", whose title is "QUALITY ASSURANCE SYSTEM", is checked. In a typical document management system, there are provided function keys indicating possible operations for the documents representing the search results, and such operations can be carried out by pressing a function key after selecting documents using the checkboxes. FIG. 4 of the present exemplary embodiment is shown with these function keys omitted because they have no direct bearing on the gist of the present invention, but they may be provided as needed.

Referring again to FIG. 2, the installation site input section 207 is used during installation of the retrieval device 101 by service personnel and other persons performing the installation for entering location-related information. It should be noted that if the retrieval device 101 contains a built-in receiver, such as a GPS receiver, information on the installation site may be acquired automatically using location information acquired using the receiver and an office layout diagram, etc. In such a case, the installation site input section 207 will no longer be an essential component.

The document contents display section 208 is used to select documents from the document list displayed by the search results display section 206 and check their contents.

Reference numeral 202 denotes a search execution section, which uses the user's search conditions entered via the search conditions input section 205 in order to retrieve documents corresponding thereto from the storage devices 105. The search results storage section 203 stores a list of documents matching the search conditions, retrieved by the search execution section 202. Whenever documents matching the search conditions are located during a search process performed by the search execution section 202, the document IDs of the retrieved documents are stored in the search results storage section 203. Subsequently, upon termination of the search process performed by the search execution section 202, the order of storage is changed by a search results display order determination section 213, which is described below.

Reference numeral 204 denotes a search results sorting section, which is the characteristic portion of the present exemplary embodiment among the components of the retrieval device 101. The search results sorting section 204 includes elements such as the search results display order determination section 213, an installation site storage section 209, a search time storage section 210, a related information storage section 212, and a related information extraction section 211.

The installation site storage section 209 stores installation site information obtained from the installation site input section 207 of the user interface section 201 or from GPS and office layout diagrams.

FIG. 5 and FIG. 6 are diagrams illustrating exemplary installation site information showing the installation site of the retrieval device 101, which is stored in the installation site storage section 209 in the present exemplary embodiment.

FIG. 5 shows that the retrieval device 101, which contains the information, is installed in Meeting Room A. Moreover, in the embodiment of FIG. 6, the retrieval device 101, which has the information, is installed not inside the meeting room, but instead in an open space in the office, such as a lobby or corridor. Information is then stored for "vicinity 1, vicinity 2, . . . " depending on the order of distance from the installation site. As can be seen, in this embodiment, the installation site of the retrieval device is closest to Meeting Room B, subsequently followed, in the order of increasing distance, by Discussion Corner 3, Tea Room, etc.

The search time storage section 210 stores the dates and times when the user entered search conditions via the search conditions input section 205 and pressed the "OK" button, issuing a command to start a search. The related information extraction section 211 accesses information associated with the installation sites stored the installation site storage section 209 and search time storage section 210, as well as time information regarding the times when searches were initiated, which is stored in the search time storage section 210. Information corresponding to the event in question is then extracted from documents stored in the various storage devices 105 coupled to the network, as well as from various services cooperating with the retrieval system, such as, for instance, the meeting room reservation device 106, schedule management device 104, entry/exit management system 103, etc.

The related information storage section 212 stores various types of information associated with events extracted and collected by the related information extraction section 211. The search results display order determination section 213 rearranges the search results in such a manner that documents believed to be closely related to the event based on the related information stored in the related information storage section 212 are shifted to a higher priority on the list. This is done by issuing an instruction to rearrange the order of search results provisionally created by the search results storage section 203 from the output results of the search execution section 202.

Reference numeral 214 denotes a document storage unit, which stores documents created by the user on a hard disk, etc., incorporated into the retrieval device 101. Reference numeral 215 denotes an external interface unit, which communicates with external services through a network and issues search requests to the various storage devices 105 on the network, etc.

Figure 7:
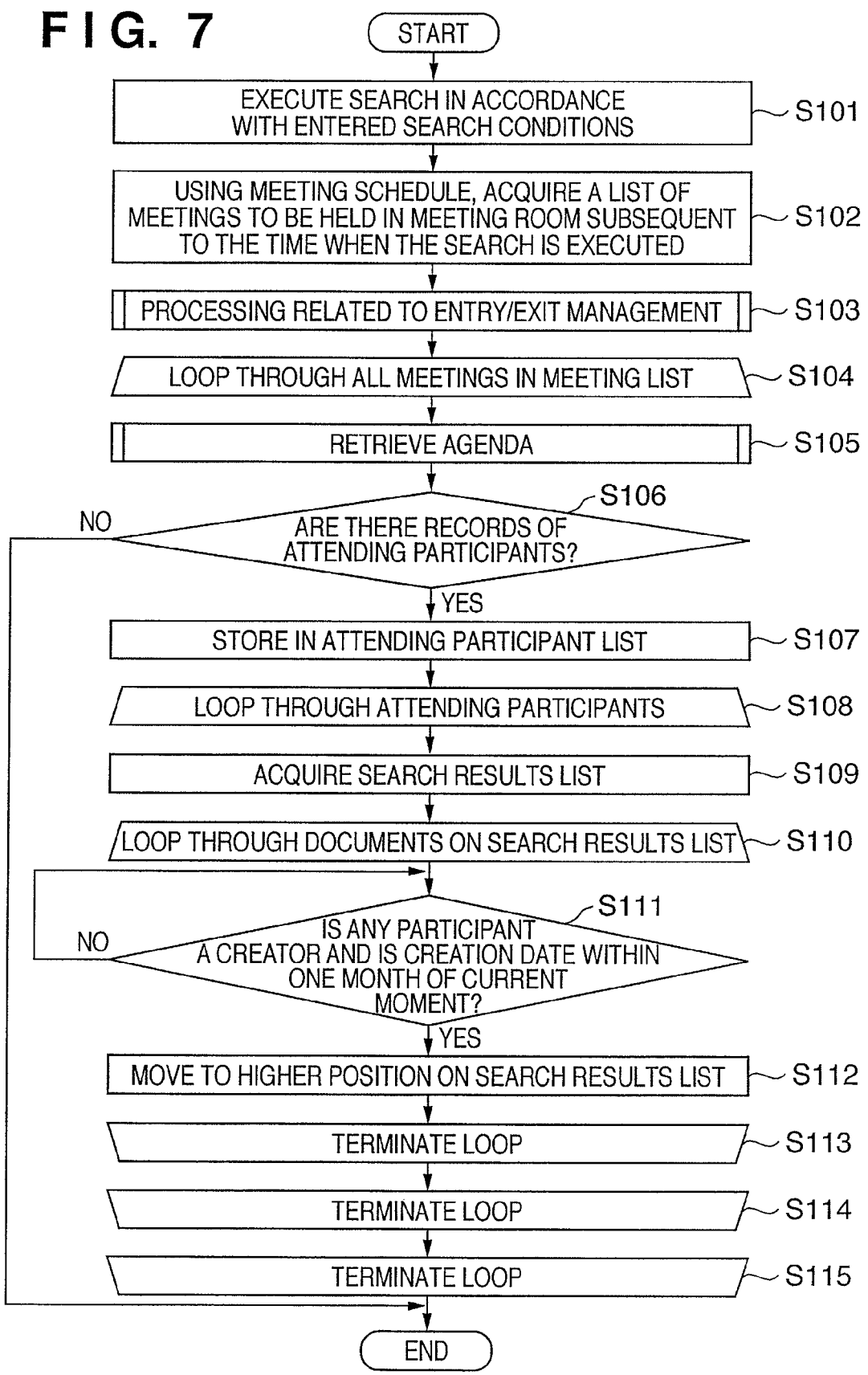
FIG. 7 is a flow chart explaining a process used in the first exemplary embodiment in order to rearrange, in the optimum display order, a document hit list obtained as a result of a search when the search is executed using a multi-functional peripheral installed in a meeting room.

FIG. 7 is a flow chart explaining a process used in the first exemplary embodiment in order to rearrange, in the optimum display order, the list of documents satisfying search conditions when a search is executed by a user on a multi-functional peripheral installed in a meeting room by entering search conditions and executing the search.

First of all, in Step S101, the search execution section 202 interprets the search conditions entered by the user via the search conditions input section 205 and searches for documents corresponding to the search conditions. During the search process, a search for documents matching the search conditions is carried out on the documents stored in the document storage unit 214, and, via the external interface unit 215, documents stored in all the storage devices 105 on the network. The thus retrieved results are stored in the search results storage section 203. Next, in Step S102, the related information extraction section 211 accesses, via the external interface unit 215, the meeting room reservation device 106 connected through the network.

FIG. 11 is diagram illustrating an exemplary meeting schedule stored in the meeting room reserving device 106 used in the present exemplary embodiment.

Meeting IDs, which identify meetings, the dates and times (dates) when the meetings are held, as well as the start times, end times, and subjects of the meetings are listed here.

The IDs and subjects of the meetings held around that time in the meeting room are then acquired based on the information about the meeting room stored in the installation site storage section 209 and information on the date/time when the search was executed, which is stored in the search time storage section 210. Furthermore, not only meetings held around that time, but all meetings scheduled to be held on that day at other times after that time, are stored in the related information storage section 212 by acquiring their meeting IDs and meeting subjects.

Next, in Step S103, information managed by the entry/exit management systems 103 is retrieved and a list of participants attending the meetings is acquired. Detailed explanations will now be provided with reference to the flow chart of FIG. 8.

Figure 8:
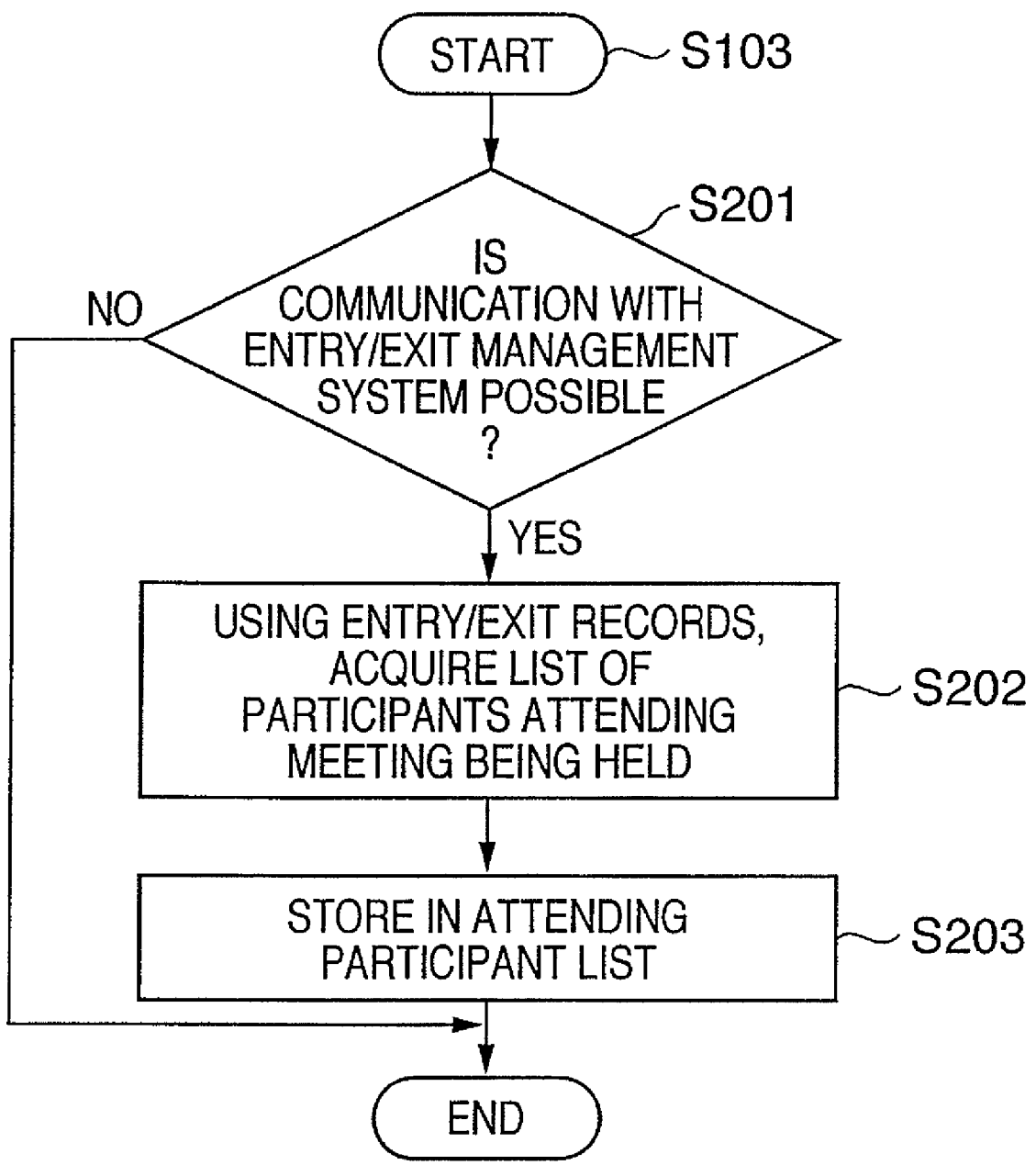
FIG. 8 is a flow chart explaining a process, whereby a multi-functional peripheral used in the present exemplary embodiment works with an entry/exit management system to acquire a list of participants attending a meeting.

FIG. 8 is a flow chart explaining a process (Step 103) executed in cooperation with the entry/exit management system 103, whereby the multi-functional peripheral (retrieval device) 101 used in the present exemplary embodiment acquires a list of participants attending meetings.

First of all, in Step S201, the related information extraction section 211 uses the external interface unit 215 to determine whether it is possible to communicate with the entry/exit management system 103, which manages entry/exit from the meeting room. If no communication with the entry/exit management system 103 is possible, the processing of the subroutine is terminated. If it is determined in Step S201 there is an entry/exit management system 103, with which communication is possible, control proceeds to Step S202. In Step S202, the system accesses the entry/exit records of the searchable entry/exit management system 103 for the meeting room, in which the multi-functional peripheral 101 is installed, and acquires a list of all the participants attending the meeting held at this point in time in this meeting room. Next, control proceeds to Step S203, where the user IDs of these users are stored in the attending participant list and the subroutine is terminated. The process above relates to the entry/exit management shown in Step S103 of FIG. 7.

Next, control proceeds to Step S104 of FIG. 7, starting a loop, in which the following identical steps are executed with respect to each meeting stored in the related information storage section 212 in Step S102. Subsequently, control proceeds to Step S105, wherein the related information extraction section 211 searches all the storage facilities on the network for an agenda containing records of proceedings and topics discussed during a meeting. The flow of processing of step S105 will be explained in detail below with reference to FIG. 9.

Figure 9:
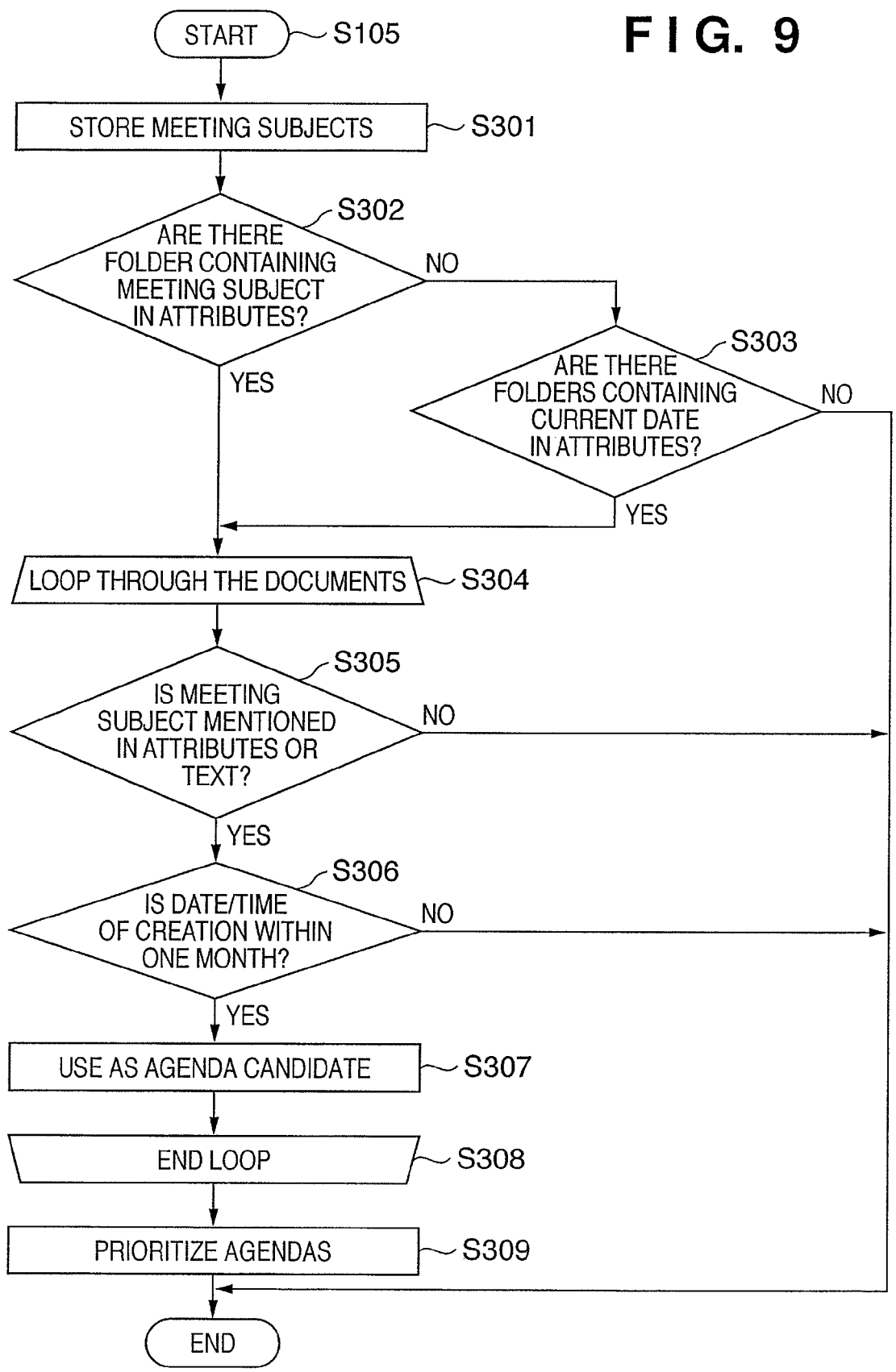
FIG. 9 is a flow chart explaining an agenda search process performed by a related information extraction section used in the present exemplary embodiment.

FIG. 9 is a flow chart explaining the agenda search process (S105) performed by the related information extraction section 211 in the present exemplary embodiment.

First of all, in Step S301, the system stores the communicated meeting subject in the workspace. Next, control proceeds to Step S302, wherein all the storage devices 105 on the network are searched to determine whether there are folders containing the subject of the meeting in the folder attributes, that is, in the folder name, folder comments, etc. Here, if there are no folders containing the meeting subject in the attributes, control proceeds to Step S303, and all the storage devices 105 on the network are similarly searched to determine whether there are folders containing a character string corresponding to the current date in the attributes of the folders. The expression "character string corresponding to the date", as used herein, is not limited to strings containing the current date, but also includes cases, in which only part of the date is included, but the current date corresponds thereto. Furthermore, it also includes cases, in which folders are sorted by year, month and day and represented in a hierarchically structured manner, with the current date contained in a unit shown in the lowest-level folder.

Figure 10:
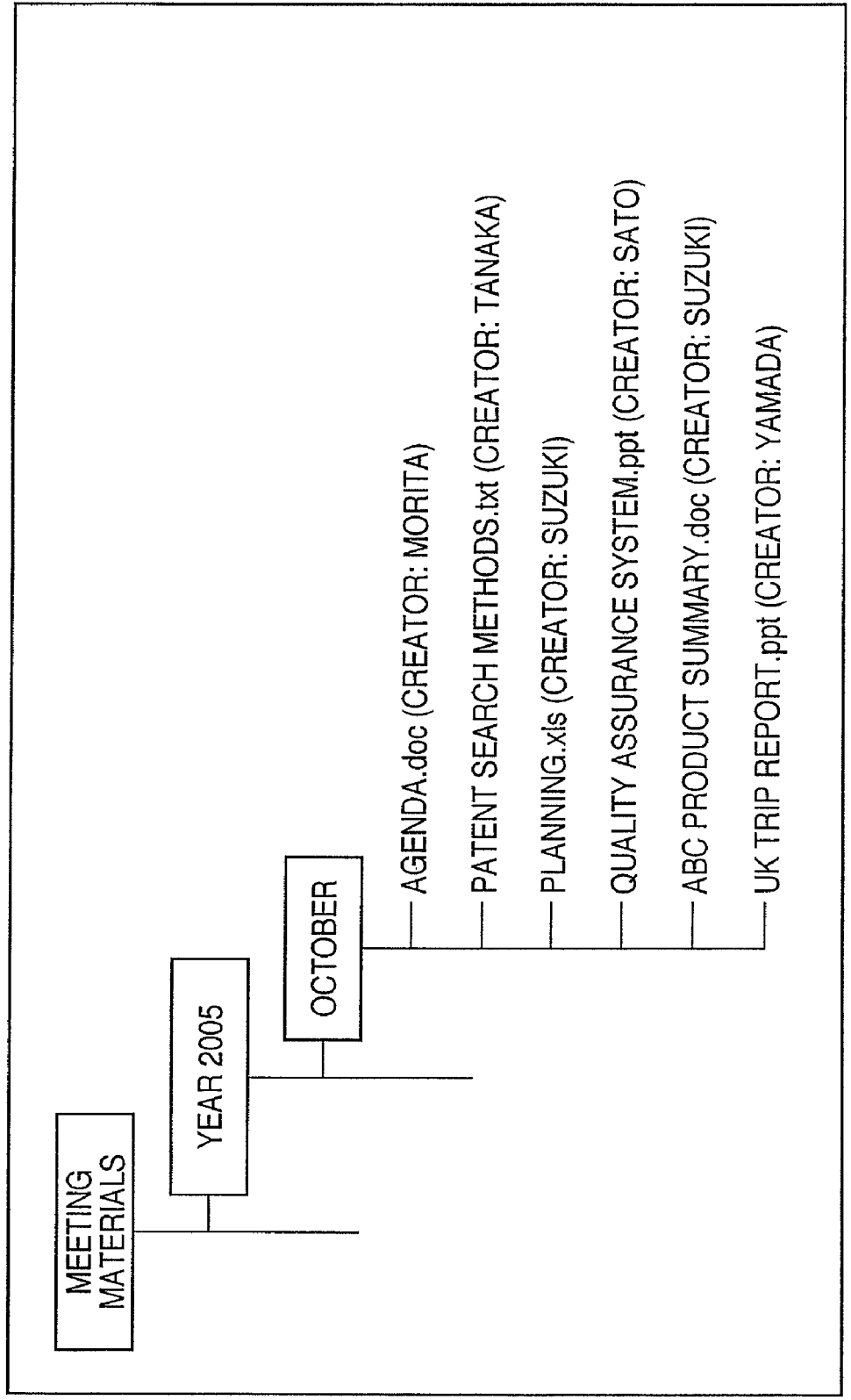
FIG. 10 is a diagram illustrating an exemplary attribute search screen used in the present exemplary embodiment.

FIG. 10 is a diagram illustrating an exemplary attribute search screen used in the present exemplary embodiment.

As shown in FIG. 10, even though each of year and month constitutes a hierarchical level of folders, when the current date corresponds to the year and month, it is assumed that the folder representing the month, that is, a lower-level folder, satisfies the condition. Then, if there is a folder containing a character string corresponding to the current date or to the meeting subject in the attributes, control proceeds to Step S304, and all the documents stored in the located folder are subjected to the following operations.

In Step S305, the process is terminated if no folder is located that contains the current date or meeting subject in the attributes. In Step S305, it is determined whether the character string of the subject of the meeting in question, or character strings suggesting an agenda, are contained in the attributes of the document, that is, the document title, comments, user index, etc. Character strings with agenda-related meanings include all terms synonymous with "agenda", such as "agenda", "topics of discussion", "proceedings", "minutes", "meeting memo", etc.

FIG. 12 is a diagram illustrating exemplary information from such an agenda.

Furthermore, if no character strings corresponding to any of the above terms are contained in any of the document attributes, the contents of the document in question are subjected to a search using a full-text search index extracted in advance in order to determine whether character strings corresponding to the above terms are present in the text of the document. Then, if corresponding character strings are contained in the attributes of the document or in the text of the document, control proceeds to Step S306. The date/time of creation and dates/times of updates to the document are accessed in Step S306. If either the date/time of creation or the dates/times of updates to the document are within one month of the current date, control proceeds to Step S307, and the document is stored in the workspace as an agenda candidate for the meeting in question.

On the other hand, if it is determined in Step S305 that no corresponding character strings are contained in the attributes of the document or in the text of the document, or if it is determined in Step S306 that the date of creation of the document is earlier than 1 month of the current date, the subroutine shown in FIG. 9 is terminated.

Once the above-described document processing of all the documents retrieved in Step S304 is over, the loop is terminated in Step S308. Next, in Step S309, priority levels are calculated for all the agenda candidates stored in the workspace, and a suitable agenda candidate for the meeting in question is selected. As far as the selection criteria are concerned, documents, in which the subject of the meeting in question is mentioned in important locations within the text, such as in the headings, etc., and documents, in which there is a scheduled participant column, are considered to be closest to an agenda, and the level of priority of such documents is raised. The description above provides a detailed explanation of the process of retrieving agendas in Step S105 of FIG. 7.

Referring again to FIG. 7, control proceeds to Step S106, wherein a determination is made as to the presence of records regarding participants scheduled to attend the meeting in question in the text of the agenda retrieved in Step S105. If there are records regarding participants scheduled to attend, control proceeds to Step S107, wherein the user IDs of the participants are acquired by querying the database of the user authentication device 107 and stored in the attending participant list. Next, control proceeds to Step S108, wherein the following operations are performed on the user IDs of all the attending participants stored in Step S107.

First of all, in Step S109, the search results list stored in the search results storage section 203 in Step S101, which includes a set of documents matching the user's search conditions, is copied to the workspace. Then, in Steps S110 to S111, all the documents acquired in Step 109 are examined to determine whether the creators of the documents are the users indicated by the user IDs and whether the creation dates of the documents are within 1 month of the current date. If such documents are found in the search results list, control proceeds to Step S112, and the search results list is rearranged by raising the priority levels of the documents such that the documents are shifted to a higher position in the sequence of the search results list. Once the examination is over for all the documents in the search results list, the loop is terminated in Step S113.

Once the above-described operation is over for all the attending participants in Step S108, the loop is terminated in Step S114. Furthermore, when these operations are over for all the meetings obtained in Step S104, the loop is terminated in Step S115. Thus, all the operations of the search results display order determination section 213 are complete. As a result, when, for instance, a document's creator is a participant attending a meeting in the meeting room and its creation date is within 1 month of the current date, the document is displayed in a higher position on the search results list.

Finally, the search results display section 206 receives the document list of the search results storage section 203 sorted by the search results display order determination section 213 and displays the search results in that order.

In this manner, in accordance with the first exemplary embodiment, when a document search is carried out on a retrieval device installed in a meeting room, the display priority of the search results is determined based on the contents and attendees of the meeting taking place at the point in time of the search, as well as on the creators and creation times, etc., of the documents subject to retrieval. As a result, the documents the user intends to obtain can be retrieved and displayed in the highest-to-lowest order of probability.

Second Exemplary Embodiment

In the above-described first exemplary embodiment, an example was explained, in which searches were executed on the retrieval device 101 installed in a meeting room. By contrast, in the second exemplary embodiment, explanations will be provided regarding a case, in which the retrieval device is installed not in a special closed environment, such as a meeting room or a reception room, but in an open environment, which has multiple unspecified company employees and external parties passing therethrough, such as a lobby, a corridor, a company canteen, etc.

Figure 13:
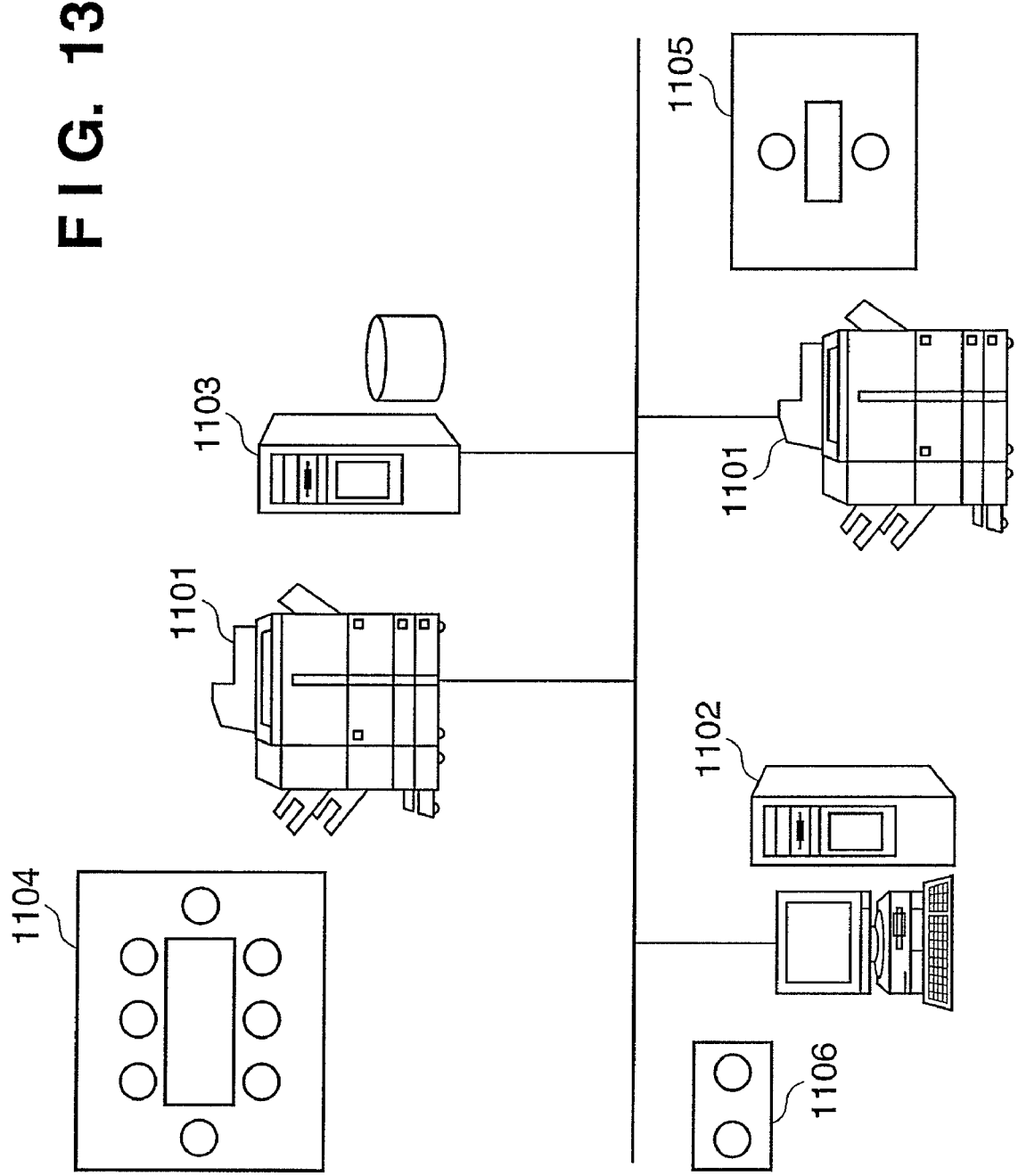
FIG. 13 is a diagram illustrating the overall configuration of the document retrieval system used in a second exemplary embodiment of the present invention.

FIG. 13 is a diagram illustrating the overall configuration of the document retrieval system according to the second exemplary embodiment of the present invention.

Reference numeral 1101 denotes a retrieval device, which corresponds to the retrieval device 101 used in the above-described first exemplary embodiment. Reference numeral 1102 denotes a visitor management device, which is capable of comprehensive management of visitor schedules entered in various departments and offers the receptionist's office, etc., the capability of quick verification. It should be noted that the configuration of the retrieval device 1101 used herein is common with the configuration illustrated in the above-described FIG. 2.

FIG. 14 is a diagram illustrating a portion extracted from a visitor list displayed at login to the visitor management device 1102 according to the second exemplary embodiment.

Here, a single line corresponds to a single visitor, with the columns designating, from left to right, the date of the scheduled visitor's visit, the time of visit, the name of the visitor, and the name of the room scheduled as the meeting location. In this embodiment, employees of Company A, represented by a Mr. X, and employees of Company B, represented by a Mr. Y, will pay a visit at 9:00 AM on Oct. 20, 2005, with the respective meeting locations being Reception Room No. 3 and the Conference Hall. Furthermore, a Mr. Z from Company C will have a meeting in Discussion Corner 2 at 9:30 AM on the same day, and a Mr. W from Company D will have a meeting in the tea room at 10:00 AM.

Going back to FIG. 13, reference numeral 1103 denotes the same document server as the storage devices 105 used in the above-described first exemplary embodiment. Reference numeral 1104 denotes Reception Room No. 3, and numeral 1105 denotes the Discussion Corner 2. Additionally, reference numeral 1106 denotes a Tea Room.

The operation of the second exemplary embodiment is explained next with reference to the flow chart of FIG. 15.

Figure 15:
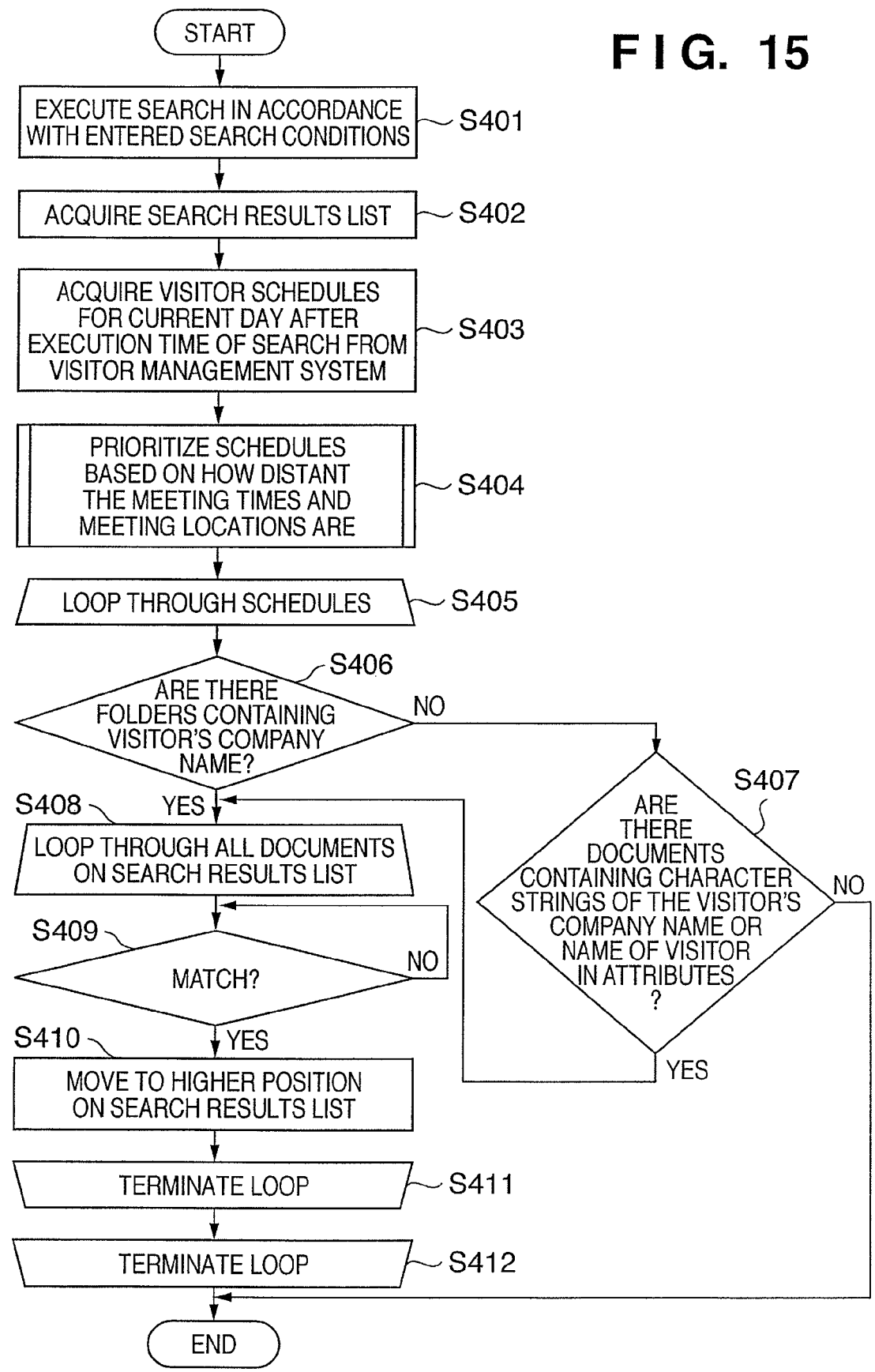
FIG. 15 is a flow chart explaining a process used in the second exemplary embodiment in order to rearrange, in the optimum display order, a document hit list obtained as a result of executing a search in a situation, wherein the search is executed using a multi-functional peripheral installed in a meeting room.

FIG. 15 is a flow chart explaining a process used in the second exemplary embodiment in order to rearrange, in the optimum display order, the list of documents satisfying search conditions, produced as a result of a search executed on a multi-functional peripheral in a situation, wherein the user enters search conditions and executes a search on a multi-functional peripheral installed in a meeting room.

First of all, in the same manner as in the first exemplary embodiment, the search execution section 202 executes a search based on the search conditions entered by the user and a list of retrieved documents is stored in the search results storage section 203 (S401 to S402). Next, communication is established with the visitor management device 1102 via the external interface unit 215, and a list of current visitors or visitors scheduled for a visit from the current moment onward is acquired based on the visitor schedules for current day (S403). The visitor list is as shown in FIG. 14.

Next, control proceeds to Step S404, wherein priority levels are computed for the visitor schedules acquired in Step S403 according to how distant the meeting times and meeting locations are from the current moment and the installation site of the retrieval device 1101. The priority level computation algorithm will be explained in detail with reference to the flow chart of FIG. 16.

Figure 16:
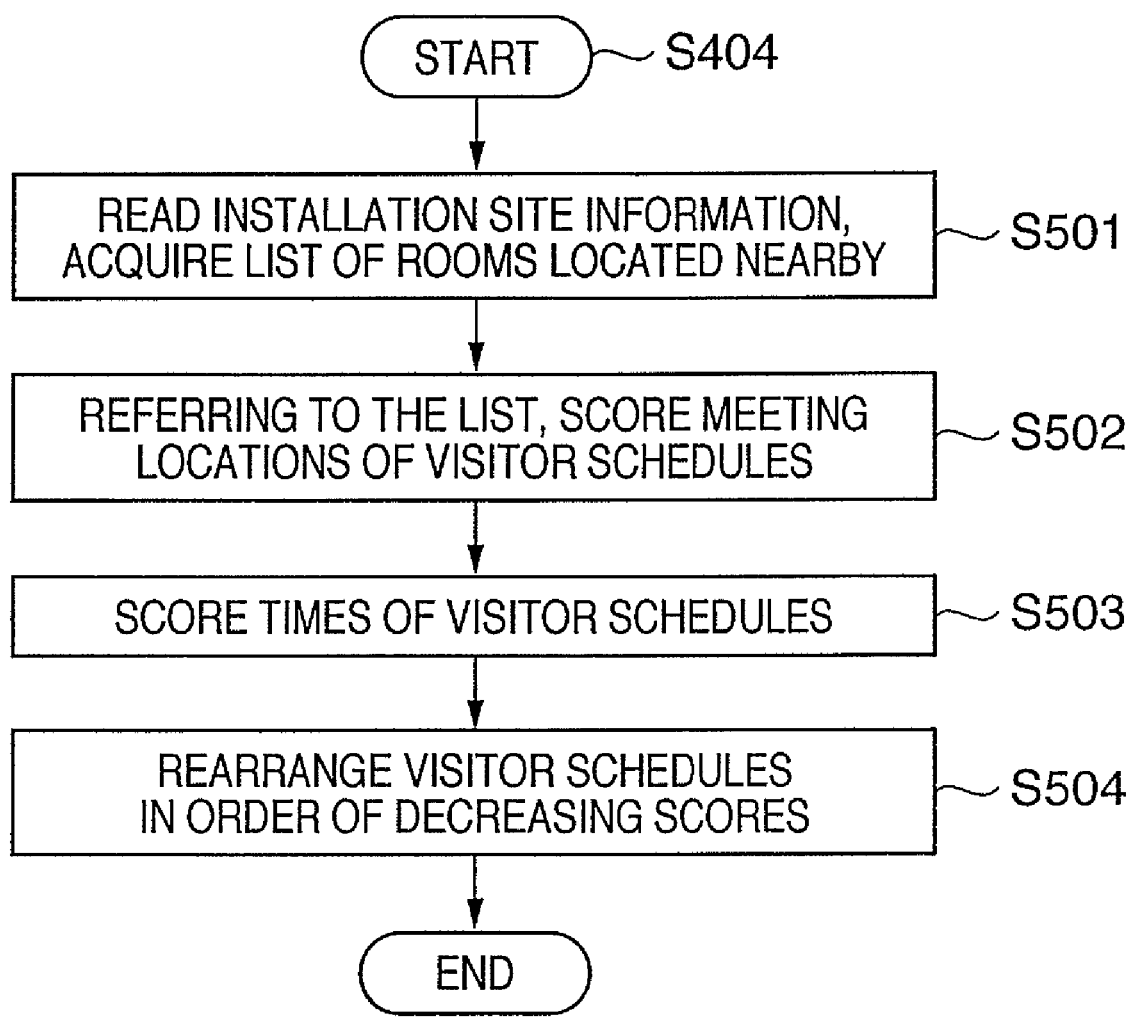
FIG. 16 is a flow chart explaining a priority level computation process used in the second exemplary embodiment.

FIG. 16 is a flow chart explaining the priority level computation process (S404) according to the second exemplary embodiment. This process is carried out by the search results sorting section 204 described above.

First of all, in Step S501, the installation site information stored in the document server 1103 is read out and a list of rooms located near the installation site of the retrieval device 1101 is acquired.

FIG. 17 is a diagram illustrating an example of such installation site information.

Here, for each retrieval device, the names of the rooms are listed in the order of increasing distance from the installation site. For instance, the order indicated for the installation site of the retrieval device 020 is Meeting Room C, Director Reception Room, Reception Room No. 3, and Meeting Room A.

The visitor schedules acquired in Step S403 are then scored based on the scoring table shown in FIG. 18 according to the meeting locations.

FIG. 18 is a diagram explaining the meeting location scoring table.

The meeting locations of the visitor schedules are scored by assigning 5 points to the room in the closest position, 4 points to the room in the second-closest position, and so on, after performing rearrangement in the order of increasing distance from the installation site of the retrieval device 1101. Rooms located in position 6 and farther are assigned a score of "0".

Furthermore, the visitor schedules acquired in Step S403 are similarly scored based on the scoring table shown in FIG. 19 according to the meeting times.

FIG. 19 is a diagram explaining an example of the meeting time scoring table.

Here, scoring is carried out by assigning a score of 6 points if the meeting time is within 30 minutes of the current moment, 5 points if the meeting time is more than 30 minutes away and within 60 minutes of the current moment, and so on, with visitor schedules more than 3 hours away assigned a score of "0".

Next, in Steps S502 to S504, total visitor schedule scores are calculated by adding up the scores assigned to the meeting locations and meeting times of each visitor schedule and the visitor schedules are rearranged in the order of decreasing total scores.

The processing of Step S404 is terminated, after which the visitor schedules are repeatedly subjected to the following operations as shown in the loop starting from Step S405 of FIG. 15.

First of all, character strings corresponding to the company names are extracted from the visitor names, and the contents of the retrieval device 1101, or storage facilities coupled to the network, such as the document server 1103, etc., are searched to determine whether there are folders including the character strings in the folder names (S406). If in Step S406 it is found that there are folders including these character strings in the folder names, control proceeds to Step S408, wherein the document IDs of all the documents contained in the folders are copied to the workspace. On the other hand, if no such folders are found, control proceeds to Step S407, wherein the search target is extended to documents inside the folder and all the storage facilities on the network are similarly searched to determine whether there are documents that have visitor company names or visitor names, etc., as document attributes. Here, if corresponding documents are found, control proceeds to Step S408, and their document IDs are copied to the workspace. In this manner, if corresponding documents are found in any of Steps S406 and S407, control proceeds to the loop starting from Step S408 and the system determines whether these documents are contained in the search results acquired in Step S402 (Step S409). If the documents are contained in the search results, the order of the document, stored in the search results storage section 203, is shifted to the highest position (S410).

Once the examination of all the thus retrieved documents is over, the loop is terminated in Step S411. Furthermore, once these operations are over for all the visitor schedules acquired in Step S403, the loop used to process the visitor schedules is terminated in Step S412. Thus, the entire process illustrated in FIG. 15 is complete.

In accordance with the second exemplary embodiment, when a retrieval device set up in an open environment is used to enter search instructions, the display order of the retrieved document titles is determined according to the location information, such as the meeting rooms located near the retrieval device, etc., as well as the time and names of the people who use the locations, etc. As a result, the documents the user intends to obtain can be retrieved and displayed in the highest-to-lowest order of probability even though these search instructions are from a retrieval device set up in an open environment.

Other Embodiments

Regardless of the detailed explanations provided above with respect to embodiments of the present invention, the present invention may be applied to a system composed of a plurality of devices, as well as applied to an apparatus constituted by a single device.

It should be noted that the present invention can be implemented by directly or remotely supplying a software program realizing the functionality of the above-described embodiments to a system or apparatus and allowing the computer of the system or apparatus to read and execute the supplied program. In such a case, so long as it has the functionality of the program, it does not have to be configured as a software program.

Therefore, the program code installed on the computer in order to implement the functional processing of the present invention on a computer is itself an implementation of the present invention. In other words, the claims of the present invention include a computer program used to implement the functional processing of the present invention. In such a case, so long as it has the functionality of the program, the form of the program, such as object code, interpreter-executed programs, script data supplied to the OS, etc., is irrelevant.

Various media can be employed as the recordable media used to supply the program. For example, it may be a floppy (™) disk, a hard disk, an optical disk, a magneto-optical disk, an MO, a CD-ROM, a CD-R, a CD-RW, a magnetic tape, a non-volatile memory card, ROM, or a DVD (DVD-ROM, DVD-R), etc.

In addition, as far as the method of supplying the program is concerned, the program can be supplied by connecting to an Internet homepage using a browser on a client computer and downloading it from the homepage onto a hard disk or another recordable medium. In such a case, the downloaded program may be the inventive computer program itself, as well as a compressed file equipped with self-installation functionality. Moreover, it can also be implemented by dividing the program code constituting the program of the present invention into a plurality of files and downloading the respective files from different homepages. In other words, WWW servers that allow a plurality of users to download program files used to implement the functional processing of the present invention on the computer are also included in claims of the present invention.

Moreover, it may take the form of encrypting the program of the present invention, storing it on a CD-ROM or another storage medium, and disseminating it among users. In such a case, users who meet certain criteria may be allowed to download information on a key used to decrypt the encryption from a homepage through the Internet and use the information on the key to install the encrypted program on a computer in executable format.

Moreover, it can be implemented in forms other than the form, in which the functionality of the above-described embodiments is implemented as a result of execution of the read program by a computer. For instance, an OS running on a computer can partially or entirely carry out actual processing based on the instructions of the program and the functionality of the above-described embodiments can be implemented based on such processing.

Furthermore, the program read from the recordable media may be written to memory provided in an expansion board inserted into a computer or an expansion unit connected to a computer. In such a case, subsequently, a CPU, etc., provided in the expansion board or expansion unit partially or entirely carries out actual processing based on the instructions of the program and the functionality of the above-described embodiments is implemented based on such processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-313598, filed Nov. 20, 2006, which is hereby incorporated by reference herein in its entirety.

What is claimed is:

1. A retrieval system for retrieving a document from among a plurality of documents, comprising:
    a search conditions input unit configured to receive search conditions input by a user on a retrieval device;
    a retrieval unit configured to retrieve, from among a plurality of documents stored in a storage device, at least one document satisfying the search conditions received by the search conditions input unit;
    a specifying unit configured to specify an event at an installation site of the retrieval device, according to scheduling information regarding a schedule of events at the installation of the retrieval device;
    a determination unit configured to identify a document related to the event specified by the specifying unit from among a plurality of documents retrieved by the retrieval unit, and determine priority levels of the plurality of retrieved documents so as to assign a higher priority level to the identified document as compared to priority levels assigned to other of the plurality of retrieved documents;
    a display unit configured to display the plurality of documents retrieved by the retrieval unit, the displayed documents being arranged in accordance with the priority levels determined by the determination unit; and
    a device information storage unit configured to store device information describing the installation site of the retrieval device,
    wherein the specifying unit specifies an event at the installation site described by the device information, and
    wherein the determination unit determines the priority level according to a difference between a time of the event specified by the specifying unit and a time when the retrieval is executed by the retrieval unit.

2. The retrieval system as claimed in claim 1, wherein the specifying unit specifies an event at the date and time when the retrieval is executed by the retrieval unit, using the scheduling information.

3. The retrieval system as claimed in claim 1, wherein the specifying unit specifies an event scheduled for date and time after the date and time when the retrieval is executed by the retrieval unit, using the scheduling information.

4. The retrieval system as claimed in claim 1, wherein the document associated with the event specified by the specifying unit is a document containing a character string indicating the name of the event.

5. The retrieval system as claimed in claim 1, wherein the document associated with the event specified by the specifying unit is a document created by a participant of the event.

6. A method of retrieving a document from among a plurality of documents, comprising the steps of:
    receiving search conditions set by a user on a retrieval device;
    retrieving, from among a plurality of documents stored in a storage device, at least one document satisfying the received search conditions;
    specifying an event at an installation site of the retrieval device, according to scheduling information regarding a schedule of events at the installation site of the retrieval device;
    identifying a document related to the specified event from among a plurality of retrieved documents;
    determining priority levels of the plurality of retrieved documents so as to assign a higher priority level to the identified document as compared to priority levels assigned to other of the plurality of retrieved documents;
    displaying the plurality of retrieved documents, the displayed documents being arranged in accordance with the determined priority levels; and
    storing device information describing the installation site of the retrieval device,
    wherein an event at the installation site described by the device information is specified, and
    wherein, in the determining step, the priority level is determined according to a difference between a time of the event and a time when the retrieval is executed in the retrieval step.

7. A method as claimed in claim 6, wherein an event at the date and time when the retrieval is executed in the retrieval step is specified using the scheduling information.

8. A method as claimed in claim 6, wherein an event scheduled for date and time after the date and time when the retrieval is executed in the retrieving step is specified using the scheduling information.

9. A method as claimed in claim 6, wherein the document associated with the specified event is a document containing a character string indicating the name of the event.

10. A method as claimed in claim 6, wherein the document associated with the specified event is a document created by a participant of the event.

11. A computer-readable recording medium storing a computer program which, when executed by a computer or processor in a document retrieval system, causes the system to:
    receive search conditions set by a user on a retrieval device;
    retrieve, from among a plurality of documents stored in a storage device, at least one document satisfying the received search conditions;
    specify an event at an installation site of the retrieval device, according to scheduling information regarding a schedule of events at the installation site of the retrieval device;
    identify a document related to the specified event from among a plurality of retrieved documents;
    determine priority levels of the plurality of retrieved documents so as to assign a higher priority level to the identified document as compared to priority levels assigned to other of the plurality of retrieved documents;
    display the plurality of retrieved documents, the displayed documents being arranged in accordance with the determined priority levels; and
    store device information describing the installation site of the retrieval device,
    wherein an event at the installation site described by the device information is specified, and
    wherein the priority level is determined according to a difference between a time of the event and a time when retrieval is executed.

12. A retrieval system for retrieving a document from among a plurality of documents, comprising:

search conditions input means for receiving search conditions input by a user on a retrieval device;

retrieval means for retrieving, from among a plurality of documents stored in a storage device, at least one document satisfying the search conditions received by the search conditions input means;

specifying means for specifying an event at an installation site of the retrieval device, according to scheduling information regarding a schedule of events at the installation site of the retrieval device;

determination means for identifying a document related to the event specified by the specifying means from among a plurality of documents retrieved by the retrieval means and determining priority levels of the plurality of retrieved documents so as to assign a higher priority level to the identified document as compared to priority levels assigned to other of the plurality of retrieved documents;

display means for displaying the plurality of documents retrieved by the retrieval means, the displayed documents being arranged in accordance with the priority levels determined by the determination means; and a device information storage means configured to store device information describing the installation site of the retrieval device, wherein the specifying means specifies an event at the installation site described by the device information, and wherein the determination means determines the priority level according to a difference between a time of the event specified by the specifying means and a time when the retrieval is executed by the retrieval means.

* * * * *